(12) United States Patent
Motohashi et al.

(10) Patent No.: US 10,794,688 B2
(45) Date of Patent: Oct. 6, 2020

(54) OPTICAL INTERFERENCE MEASURING DEVICE

(71) Applicant: MITUTOYO CORPORATION, Kanagawa (JP)

(72) Inventors: Ken Motohashi, Eindhoven (NL); Johannes Anna Quaedackers, Veldhoven (NL); Adriaan Tiemen Zuiderweg, Breda (NL)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/293,027

(22) Filed: Mar. 5, 2019

(65) Prior Publication Data
US 2019/0277628 A1    Sep. 12, 2019

(30) Foreign Application Priority Data
Mar. 7, 2018  (JP) .................................. 2018-040375

(51) Int. Cl.
*G01B 9/02* (2006.01)
*G01B 11/24* (2006.01)

(52) U.S. Cl.
CPC ........ *G01B 11/2441* (2013.01); *G01B 9/0209* (2013.01); *G01B 9/02083* (2013.01)

(58) Field of Classification Search
CPC ............ G01B 11/2441; G01B 9/02027; G01B 9/02049; G01B 9/0209
See application file for complete search history.

(56) References Cited

U.S. PATENT DOCUMENTS

| 4,392,745 A | * | 7/1983 | Wright | B29D 30/0061 |
| | | | | 356/458 |
| 8,891,090 B2 | | 11/2014 | Nagahama et al. | |
| 9,103,651 B2 | | 8/2015 | Haitjema et al. | |
| 9,618,321 B2 | | 4/2017 | Motohashi et al. | |
| 9,726,473 B2 | | 8/2017 | Okabe et al. | |

(Continued)

FOREIGN PATENT DOCUMENTS

| JP | 2011-191118 A | 9/2011 |
| JP | 2015-045575 A | 3/2015 |
| JP | 2015-118076 A | 6/2015 |

*Primary Examiner* — Jonathan M Hansen
(74) *Attorney, Agent, or Firm* — Greenblum & Bernstein, P.L.C.

(57) ABSTRACT

An interferometric optical device that measures the curved wall shape of a cylindrical object and includes: an interferometric optical system that emits measurement light at the curved wall of the object, collects the light reflected by the object, and creates a composite wave that combines the reflected light and a reference light; a rotation drive assembly that is connected to the interferometric optical system and rotationally displaces the interferometric optical system centered about a rotation axis that coincides with a center axis of the cylindrical shape of the object; a sensor that acquires a two-dimensional distribution of the intensity of the composite wave using a plurality of photoreceptor elements arrayed two-dimensionally; and a computation device that computes the internal wall shape of the object based on the plurality of two-dimensional distributions acquired in a state where a rotation angle for the rotation drive mechanism varies.

11 Claims, 13 Drawing Sheets

(56) References Cited

U.S. PATENT DOCUMENTS

| | | | |
|---|---|---|---|
| 2003/0038945 A1* | 2/2003 | Mahner | G01B 11/2441 |
| | | | 356/457 |
| 2005/0264796 A1* | 12/2005 | Shaw | G01B 11/162 |
| | | | 356/237.2 |
| 2014/0362383 A1 | 12/2014 | Haitjema et al. | |
| 2014/0373614 A1* | 12/2014 | Steinbichler | G01M 17/027 |
| | | | 73/146 |
| 2018/0031415 A1 | 2/2018 | Haitjema et al. | |

* cited by examiner

OPTICAL INTERFERENCE MEASURING DEVICE

CROSS-REFERENCE TO RELATED APPLICATIONS

The present application claims priority under 35 U.S.C. § 119 of Japanese Application No. 2018-040375, filed on Mar. 7, 2018, the disclosure of which is expressly incorporated by reference herein in its entirety.

BACKGROUND OF THE INVENTION

1. Field of the Invention

The present invention relates to a measuring device that measures a three-dimensional shape, and more specifically relates to an optical interferometric device for measurement that measures the shape of a surface which is cylindrical in nature.

2. Description of Related Art

Optical interferometry using brightness information for an interference pattern generated by the interference of light is one known method for non-contact measurement of surface height, surface roughness, a three-dimensional shape, and the like of a measured object. An optical interferometric device for this purpose makes use of the fact that peaks in interference patterns of various wavelengths overlap and are combined at a focus position where an optical path length of a reference light path matches the optical path length of a measurement light path, increasing the brightness of the interference pattern. Accordingly, while performing a scan that changes the optical path length of the reference light path or measurement light path, the optical interferometric device uses an image capture element such as a CCD camera to capture an interference image showing a two-dimensional distribution of interference optical intensity. Also, by detecting the focus position where the intensity of the interference pattern reaches a peak at various measurement positions in an image capture field of view, the height of a measured surface at each measurement position is measured and the three-dimensional shape of the measured object, for example, is measured (see Japanese Patent Laid-open Publication Nos. 2011-191118, 2015-045575, and 2015-118076, for example). When the measured object spans a plurality of image capture fields of view, a scan is performed in each field of view in turn.

However, when the surface of the measured object is cylindrical, each field of view must be scanned while modifying the image capture field of view in order to cover a measurement target range. Furthermore, because the object surface has a curved shape, the range to be scanned in a radial direction must be increased in size as compared to a case where a flat surface is measured, and the measurement takes time.

SUMMARY OF THE INVENTION

The present invention provides an optical device for measurement utilizing interferometry for non-contact surface metrology that is capable of measuring the shape of a cylindrical surface of an object in a short amount of time.

In order to achieve this, such an interferometric optical device for measurement according to the present invention measures the shape of a cylindrical surface of an object and includes: an interferometric optical system that emits measurement light generated by an illuminator at a curved surface of an object, collects the light reflected by the object, and creates a composite wave that combines the reflected light and a reference light; a rotation drive mechanism that is connected to the interferometric optical system and rotationally displaces the interferometric optical system centered about a rotation axis that coincides with a center axis of a cylindrical surface of the object; a sensor that acquires a two-dimensional distribution of the intensity of the composite wave using a plurality of photoreceptor elements arrayed two-dimensionally; and a computation device that computes the shape of the object based on the plurality of two-dimensional distributions acquired in a state where a rotation angle for the rotation drive mechanism varies. According to this configuration, the shape of a cylindrical surface of an object can be measured in a short amount of time.

In the present invention, the interferometric optical device for measurement may rotationally displace the interferometric optical system by a predetermined rotation angle unit each time using the rotation drive mechanism while keeping a distance of the interferometric optical system from the rotation axis constant, and may acquire a two-dimensional distribution for each rotation angle using the sensor. In this way, the shape of a cylindrical surface of the object can be continuously measured without repeatedly performing scans in a direction perpendicular to the measured surface of the object.

In the present invention, the interferometric optical system may include a beam splitter that splits incident light into reference light and measurement light, and that also outputs a composite wave that combines light that has traversed a reference light path and reflected light from the object; and a reference mirror that is provided on the reference light path and reflects the reference light. The reference mirror may be arranged so that it is tilted with respect to an optical axis of the reference light, with a direction parallel to the optical axis of the measurement light as an axis of inclination. In this way, sensitivity to a change in interference intensity corresponding to the unevenness of the object can be enhanced.

In the present invention, the reference mirror may have a reflecting surface formed in the concave or convex shape of a partial cylinder, corresponding to the shape of the surface to be measured. Also, the curved surface configuring the reflecting surface of the reference mirror may have a variable curvature.

In the present invention, the interferometric optical system may be arranged such that a straight line extending the optical axis of the measurement light emitted at the cylindrical surface of the object does not pass through the rotation axis. In this way, sensitivity to a change in interference intensity corresponding to the unevenness of the object can be enhanced.

In the present invention, the interferometric optical device for measurement may further include an axis direction drive mechanism that displaces the interferometric optical system in a direction following the rotation axis, and may displace the interferometric optical system in a spiral shape, and acquire the two-dimensional distribution at each position along the spiral using a position sensor.

In the present invention, the interferometric optical device for measurement may include a plurality of interferometric optical systems having mutually different positions in a direction following the rotation axis. In this way, the measurement range in the direction following the rotation axis can be expanded and measurement time can be shortened.

In the present invention, the interferometric optical device for measurement may further include a radial direction drive mechanism that is connected to the interferometric optical system and displaces the interferometric optical system in a radial direction orthogonal to the rotation axis. In this way, measurement of cylindrical surfaces of objects having various diameters can be conducted at appropriate focus positions.

In the present invention, the radial direction drive mechanism may be configured so as to not displace the system in the radial direction. In this way, a burden on the radial direction drive mechanism can be alleviated and displacement in the radial direction can be facilitated.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
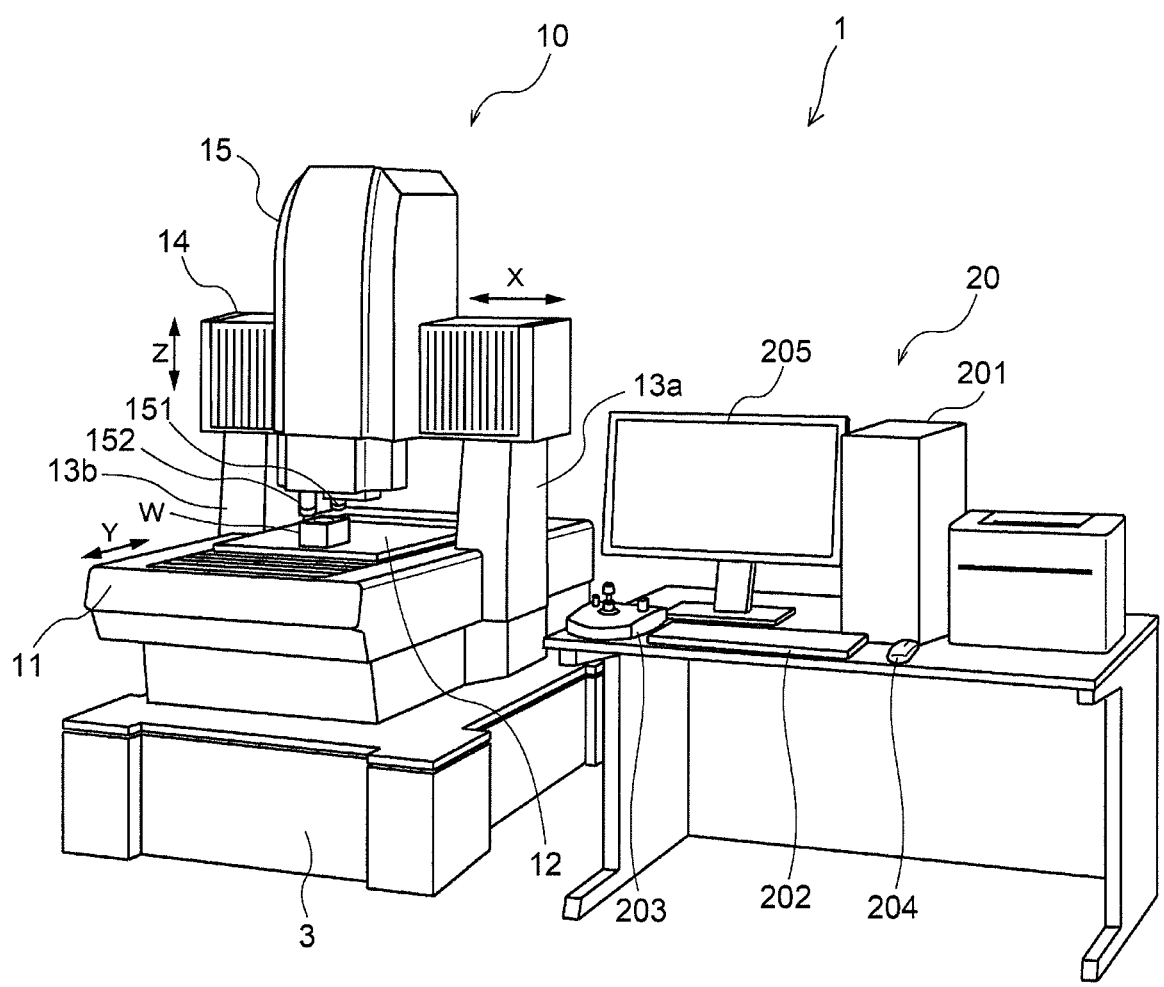
FIG. 1 illustrates an overall configuration of an image measuring device according to an embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings. In the following description, portions identical to those which have been previously described are assigned identical reference numerals and a description thereof is omitted where appropriate.

Overall Configuration of Measurement Apparatus

FIG. 1 illustrates a measurement device apparatus according to the present embodiment, and more specifically, illustrates an overall configuration of an optical measurement device that is capable of surface measurement utilizing optical interferometry. As illustrated in FIG. 1, an optical measurement device 1 according to the present embodiment includes a device main body 10 that measures the shape of an object W and a computer system (computer) 20 that controls the device main body 10 and also executes necessary data processing. In addition to these components, the optical image measurement device 1 may also include, for example, a printer that prints out measurement results or the like, as appropriate. The optical image measurement device 1 according to the present embodiment is applied to shape measurement of an object W, which can have a cylindrical interior wall, such as an interior wall of a piston chamber; or a cylindrical exterior wall, such as a piston to mention two nonexclusive examples.

The device main body 10 includes a table 11, a stage 12, an X axis guide 14, and an image capture apparatus 15. In the present embodiment, an X axis direction (direction along an X axis) is in one direction along a surface of the stage 12. A Y axis direction (direction along a Y axis) is in a direction along the surface of the stage 12, orthogonal to the X axis direction. A Z axis direction (direction along a Z axis) is a direction orthogonal to the X and Y axis directions. The Z axis direction may also be referred to as a vertical direction. The X and Y axis directions may also be referred to as horizontal directions.

The table 11 is positioned atop an anti-vibration table 3, for example, and inhibits external vibrations from being transmitted to the stage 12 on the table 11 and to the image capture apparatus 15. The stage 12 is positioned above the table 11. The stage 12 is a table on which a measured object W is placed. The stage 12 is provided so as to be capable of being displaced by a Y axis drive mechanism (not shown in the drawings) in the Y axis direction with respect to the table 11.

Support portions 13a and 13b are provided on two side portions of the table 11. The support portions 13a and 13b are each provided extending upward from the side portions of the table 11. The X axis guide 14 is provided bridging the tops of the support portions 13a and 13b. The image capture apparatus 15 is attached to the X axis guide 14.

The image capture apparatus 15 is provided so as to be capable of displacing in the X axis direction along the X axis guide 14 by an X axis drive mechanism, and so as to be capable of displacing in the Z axis direction by a Z axis drive mechanism. With these drive mechanisms, both of which may be provided with one or more electric motors or other system that imparts motive force, a relative positional relationship between the object W on the stage 12 and the image capture apparatus 15 can be defined along each of the X, Y, and Z axes. In other words, by adjusting this positional relationship, an image capture region of the image capture apparatus 15 can be matched to a measurement region of the object W. According to one feature, the object W is fixed and the image capture apparatus 15 is moved relative to the fixed object in order to to measure the object; however, according to another feature, the image capture apparatus 15 may be fixed and the object W may be moved relative to the fixed image capture apparatus, in order to measure the object.

The image capture apparatus 15 is detachably provided with an image optical system 151 that captures a two-dimensional image of the object W and an interferometric optical system 152 that measures a three-dimensional shape of the object W using an optical interference measurement. Using either of these systems, the image capture apparatus 15 measures the object W in a measurement position defined by the computer system 20. The image capture apparatus 15 is provided with a drive mechanism portion 153 that displaces the interferometric optical system 152.

A measurement field of view of the image optical system 151 is ordinarily set to be wider than the measurement field of view of the interferometric optical system 152, and control by the computer system 20 allows switching between the two systems for use. The image optical system 151 and the interferometric optical system 152 are calibrated ahead of time such that coordinate axes of the measurement do not change before or after switching.

The image optical system 151 captures a two-dimensional image of the object W and is provided with an image capture element (CCD camera, CMOS camera, or the like), an illumination device, a focusing mechanism, and the like. Data for the captured two-dimensional image is imported into the computer system 20.

The interferometric optical system 152 performs shape measurement of the object W using a white light interferometry method, for example. In the present embodiment, the interferometric optical system 152 is an example of a measurement system. Details of the interferometric optical system 152 are described hereafter.

The computer system 20 includes a computer main body 201, a keyboard 202, a mouse 204, and a display 205. The computer main body 201 controls operations of the device main body 10 and the like. The computer main body 201 controls the operations of the device main body 10 using a circuit such as a control board (hardware) and a program executed by a CPU (software). In addition, the computer main body 201 calculates data for the object W based on a signal output from the device main body 10, and displays the calculation result on the display 205.

A joystick 203 is used when setting the position where image capture of the object W is performed. Specifically, a user operates the joystick 203 and can thereby change the relative positional relationship between the object W and the image capture apparatus 15, and can adjust the position of the image capture region displayed on the display 205.

Figure 2:
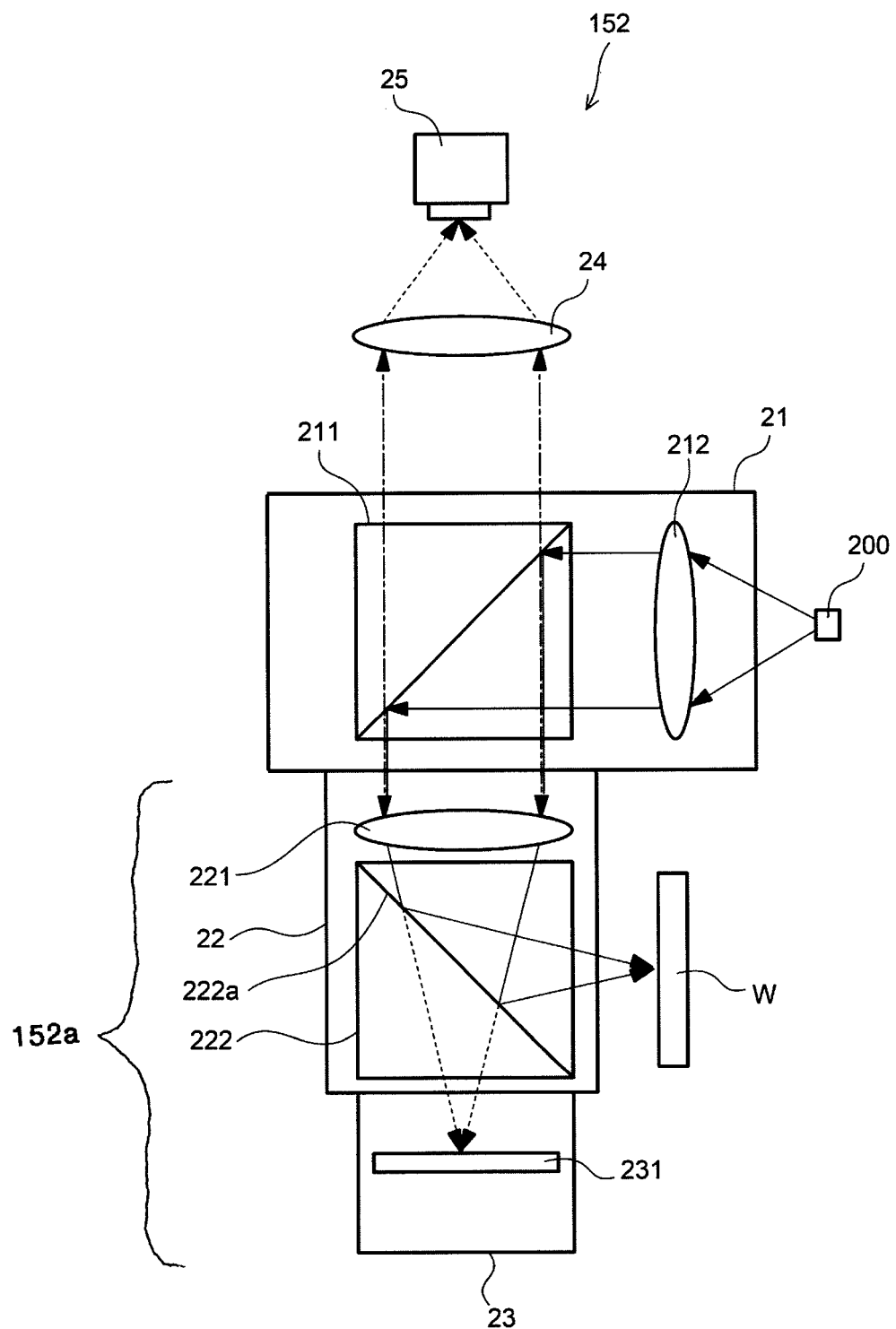
FIG. 2 is a schematic view illustrating an exemplary configuration of an interferometric optical system.

FIG. 2 is a schematic view illustrating an exemplary configuration of an interferometric optical system. As illustrated in FIG. 2, the interferometric optical system 152 includes a light emission portion (illuminator) 200, an illumination optics portion 21, an objective lens portion 22, a reference mirror portion 23, an imaging lens 24, and an image capturer 25. The objective lens portion 22 and reference mirror portion 23 may additionally be considered as the interferometric objective lens assembly 152a.

The light emission portion (illuminator) 200 includes a light source that outputs broadband light having a large number of wavelength components over a broad band and low coherence. For example, a white light source such as a halogen or light emitting diode (LED) may be used. Alternatively, a narrow band light source may be used, for example a laser or narrow bandwidth LED illuminator.

The illumination optics 21 includes a beam splitter 211 and a collimator lens 212. The light emitted from the light emission portion 200 is emitted from a direction orthogonal to an optical axis of the objective lens portion 22 and parallel to the beam splitter 211, via the collimator lens 212. Light along the optical axis is emitted from the beam splitter 211 and a parallel beam is emitted from above at the objective lens portion 22.

Within interferometric objective lens assembly 152a, the objective lens portion 22 is configured to include an objective lens 221, a beam splitter 222, and the like. In the objective lens portion 22, when the parallel beam strikes the objective lens 221 from above, the objective lens 221 forms the incident light into convergent light, which strikes a reflecting surface 222a inside the beam splitter 222. In this example, the incident light is split into transmitted light (reference light) that proceeds along a reference light path (dashed line in the drawings) that includes a reference mirror 231 inside the reference mirror portion 23, and reflected light (measurement light) that proceeds along a measurement light path (solid line in the drawings) towards where the object W is positioned. An optical axis direction of the reflected light reflected by the reflecting surface 222a is a direction orthogonal to the optical axis direction of the incident light. In this example, various directions may be considered for the direction orthogonal to the optical axis direction of the incident light, but the optical axis direction of the reflected light is directed in a radial direction oriented outward from a center of a rotation drive mechanism (rotation driver, rotation drive assembly, rotation drive system) 153a (described below) and is emitted at the object W. The transmitted light converges and is reflected by the reference mirror 231, and further is transmitted through the reflecting surface 222a of the beam splitter 222. Meanwhile, the reflected light converges and is reflected by the object W, then is reflected by the reflecting surface 222a of the beam splitter 222. The reflected light from the reference mirror 231 and the reflected light from the object W are combined by the reflecting surface 222a of the beam splitter 222 and form a composite wave.

The composite wave that is combined at the position of the reflecting surface 222a of the beam splitter 222 is formed into a parallel beam by the objective lens 221 and proceeds upward, is transmitted through the beam splitter 211 in the illumination optics portion 21, and strikes the imaging lens 24 (dot-dashed line in FIG. 2). The imaging lens 24 converges the composite wave and causes an interference image to form on the image capturer 25.

Figure 3:
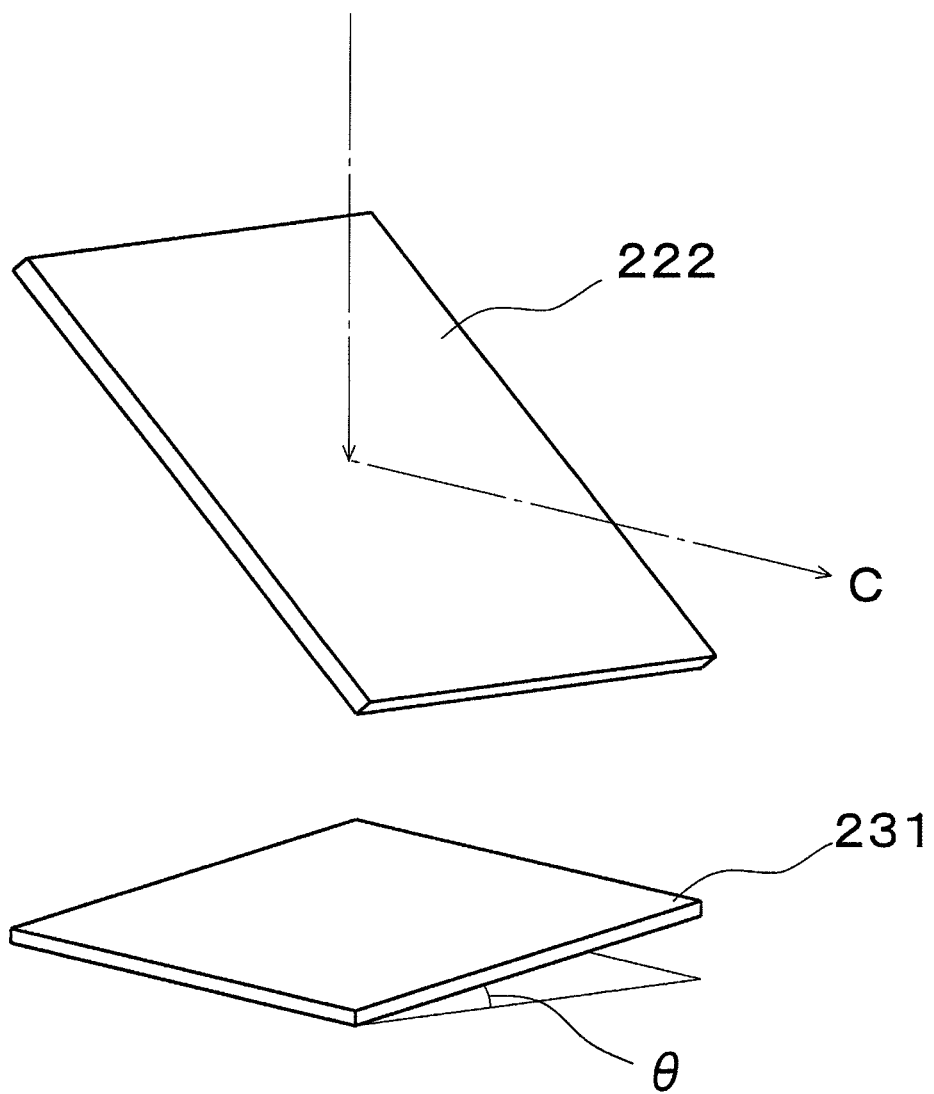
FIG. 3 is a schematic view illustrating an incline of a reference mirror.

The reference mirror portion 23 holds the reference mirror 231, which reflects the transmitted light (reference light) that proceeds along the reference light path that is forked by the beam splitter 222 described above. The reflecting surface of the reference mirror 231 is configured as a flat mirror surface. The reference mirror 231 may be arranged so as to intersect orthogonally with the optical axis of the transmitted light (reference light), but as illustrated in FIG. 3, in the present embodiment, the reference mirror 231 is preferably arranged so as to be tilted relative to the optical axis of the transmitted light, with a direction parallel to an optical axis C of the reflected light (measurement light) as an axis of inclination (an inclination angle is indicated by θ in FIG. 3). By tilting the reference mirror 231 in this way, a difference in optical path length for the reference light path is generated by a reflection position in the reference mirror 231. An amount of inclination of the reference mirror 231 is preferably configured such that unevenness on the object W within the image capture field of view of the image capturer 25 is a similar size as the difference in optical path length. By tilting the reference mirror 231 in this way, sensitivity to a change in an interference pattern corresponding to the unevenness of the object W can be enhanced.

When, for example, the object W is a cylindrical interior wall, such as a piston chamber, an interior wall surface is arranged to be substantially perpendicular to the stage 12. Therefore, light that is converged by the objective lens 221 is reflected at a right angle (in the horizontal direction) by the beam splitter 222 and measurement light is emitted, or fired, at the perpendicular interior wall surface of the piston chamber.

As described above, the illumination optics portion 21, the objective lens portion 22, and the reference mirror portion 23 are equivalent to an interferometric optical system 152 in the present invention, and measurement light strikes the cylindrical interior wall of the object W, reflected light from the object W is focused, and a composite wave that combines the reflected light and the reference light is generated. In the following, the illumination optics 21, the objective lens portion 22, and the reference mirror portion 23 may collectively be referred to as an "interferometric optical system."

The image capturer 25 is a CCD camera or the like configured by a two-dimensional image capture element for configuring an image capture component. The image capturer 25 captures an interference image that is a two-dimensional distribution of the intensity of the composite wave (reflected light from the object W and reflected light from the reference mirror 231) output from the objective lens portion 22. Data for the captured image is imported into the computer system 20.

Figure 4:
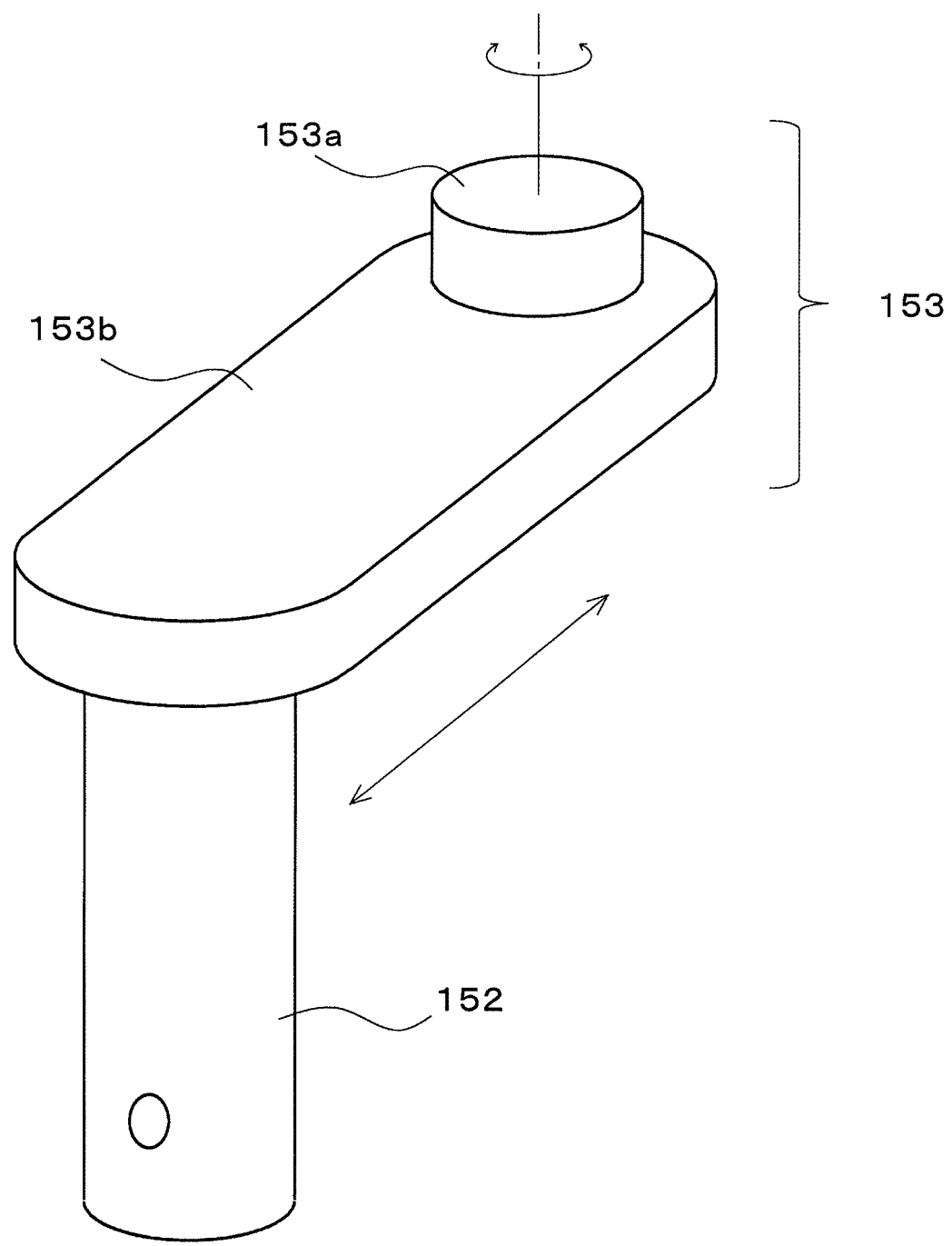
FIG. 4 is a schematic view illustrating a configuration of a drive mechanism portion, together with the interferometric optical system.

The drive mechanism portion 153 supports the interferometric optical system 152 and, based on a displacement instruction from the computer system 20, displaces the interferometric optical system 152 via an electric motor or other system that imparts motive force. FIG. 4 is a schematic view illustrating a configuration of the drive mechanism portion 153, together with the interferometric optical system 152. The drive mechanism portion 153 includes the rotation drive mechanism 153a and a radial direction drive mechanism (radial direction driver, radial direction drive assembly, radial direction drive system) 153b, both of which may be provided with one or more electric motors or other system that imparts motive force. The rotation drive mechanism 153a is directly or indirectly connected to the interferometric optical system 152 and causes the interferometric optical system 152 to displace by rotating centered around a rotation axis A. The rotation axis A is adjusted so as to be parallel to the optical axis of the light that is incident on the objective lens 221. The radial direction drive mechanism 153b is directly or indirectly connected to the interferometric optical system 152 and causes the interferometric optical system 152 to displace in a radial direction that is orthogonal to the rotation axis A. In addition to the rotation drive mechanism 153a and the radial direction drive mechanism 153b, the drive mechanism portion 153 may also include an axis direction drive mechanism (axis direction driver, axis direction drive assembly, axis direction drive system) that displaces the interferometric optical system 152 in a direction parallel to the rotation axis A. However, in a case where the optical axis of the light that is incident on the objective lens 221 is aligned parallel to the Z axis, the Z axis drive mechanism of the main body can by leveraged as the axis direction drive mechanism. In the present embodiment, the Z axis drive mechanism of the main body is leveraged as the axis direction drive mechanism.

Measurement Method and Measurement Program

A method is described in which the object W (a surface of which has a cylindrical shape) undergoes surface measurement by the image measuring device 1 having the configuration described above. The measurement method includes the following steps:

(1) Determining the position of the interferometric optical system 152 relative to the object W (2) Capturing interference images on a running basis while displacing the rotation drive mechanism 153a by a predetermined angle each time in a state where the radial direction position of the interferometric optical system 152 is fixed (3) Obtaining a three-dimensional shape of the object W based on the plurality of interference images Each of the steps (1) to (3) above are executed by the computer system 20 of the image measuring device 1 and a program (measurement program) run by the computer system that reads three-dimensional data acquired by the device main body 10. The computer may also be included in the computer system 20.

Figure 5:
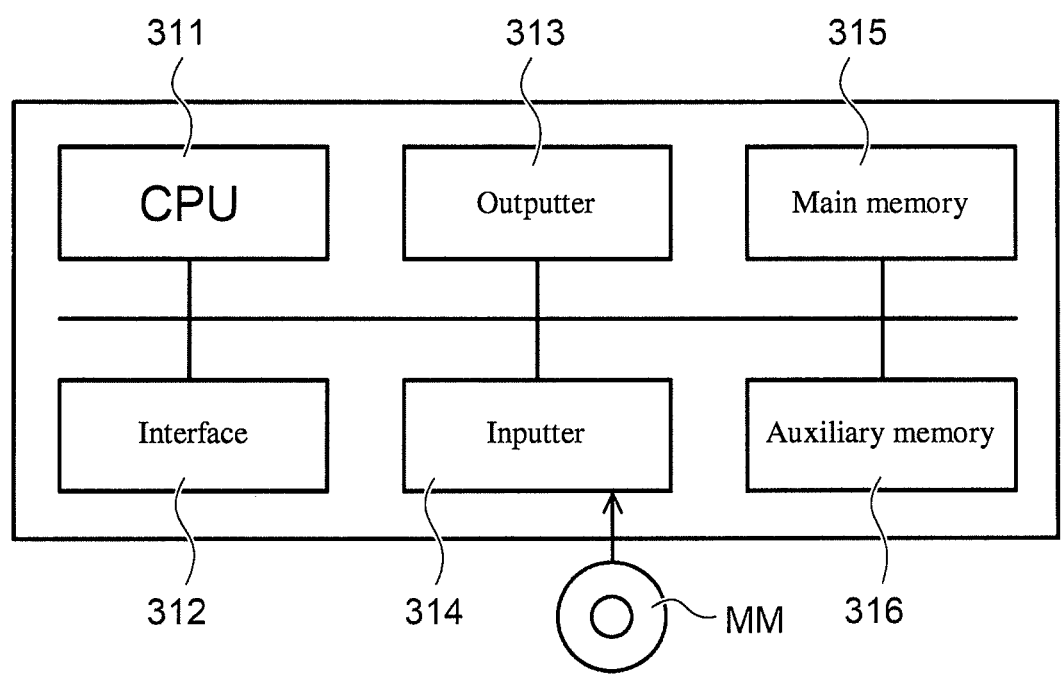
FIG. 5 is a block diagram illustrating an exemplary configuration of a computer.

FIG. 5 is a block diagram illustrating an exemplary configuration of the computer system 20. The computer includes a central processing unit (CPU, also referred to as a processor) 311, interface 312, outputter 313, inputter 314, main memory 315, and auxiliary memory 316.

The CPU 311 controls various components by executing various programs stored in memory 315 and/or 316. The interface 312 performs data input/output with an external device. In the present embodiment, data sent from the device main body 10 is imported into the computer via the interface 312. In addition, data is sent from the computer to the device main body 10 via the interface 312. The interface 312 may also connect the computer to a local area network (LAN) or wide area network (WAN).

The output device 313 outputs results of processing by the computer. The display 205 shown in FIG. 1 or a printer, for example, may be used as the output device 313. The input device 314 receives data from the user. A keyboard or mouse, for example, may be used as the input device 314. The input device 314 also reads data stored in a memory medium MM.

A random access memory (RAM) may be used as the main memory 315, for example. A portion of the auxiliary memory 316 may also be used as a portion of the main memory 315. A hard disk drive (HDD) or solid state drive (SSD) may be used as the auxiliary memory 316, for example. The auxiliary memory 316 may also be an external memory device connected via a network.

Figure 6:
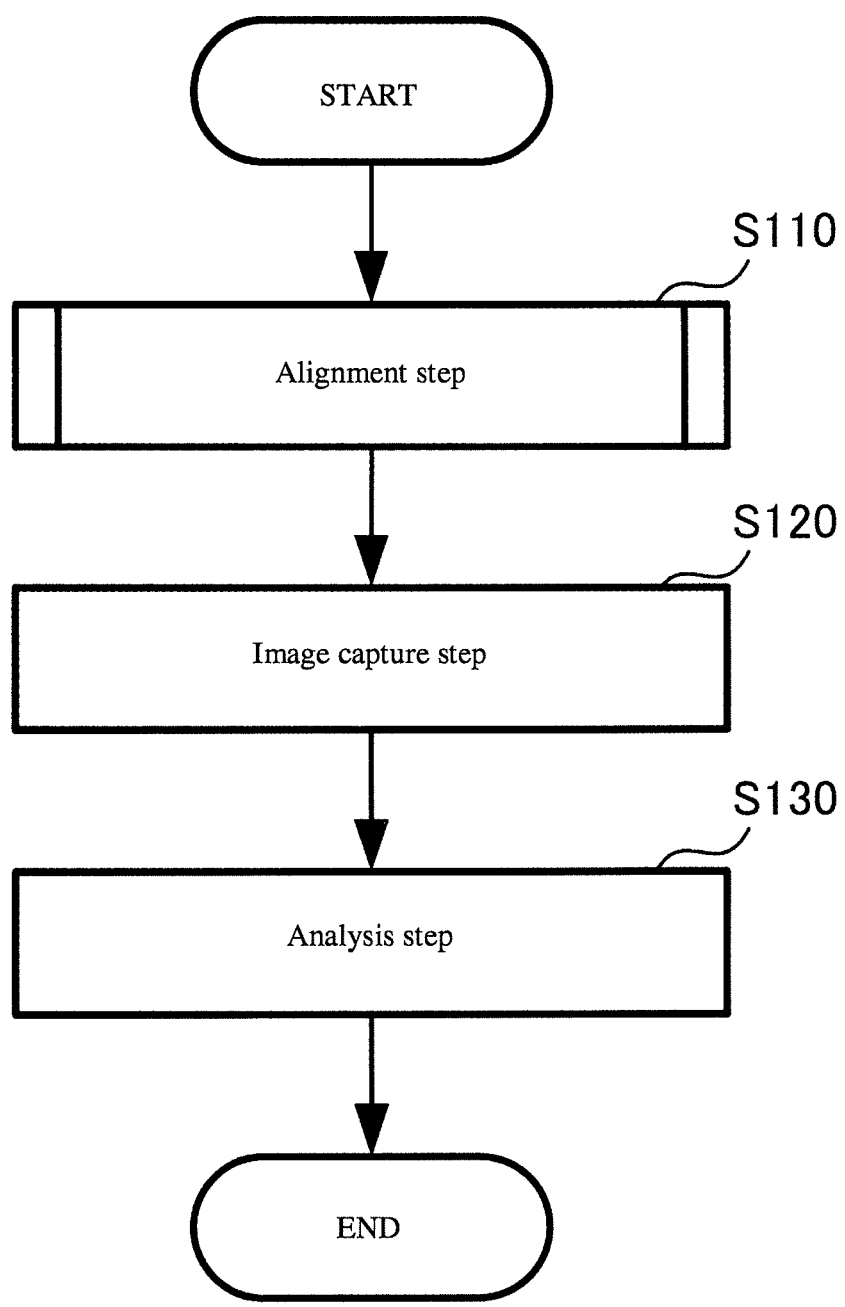
FIG. 6 is a flow chart illustrating an exemplary flow of a measurement program according to the embodiment.
Figure 7:
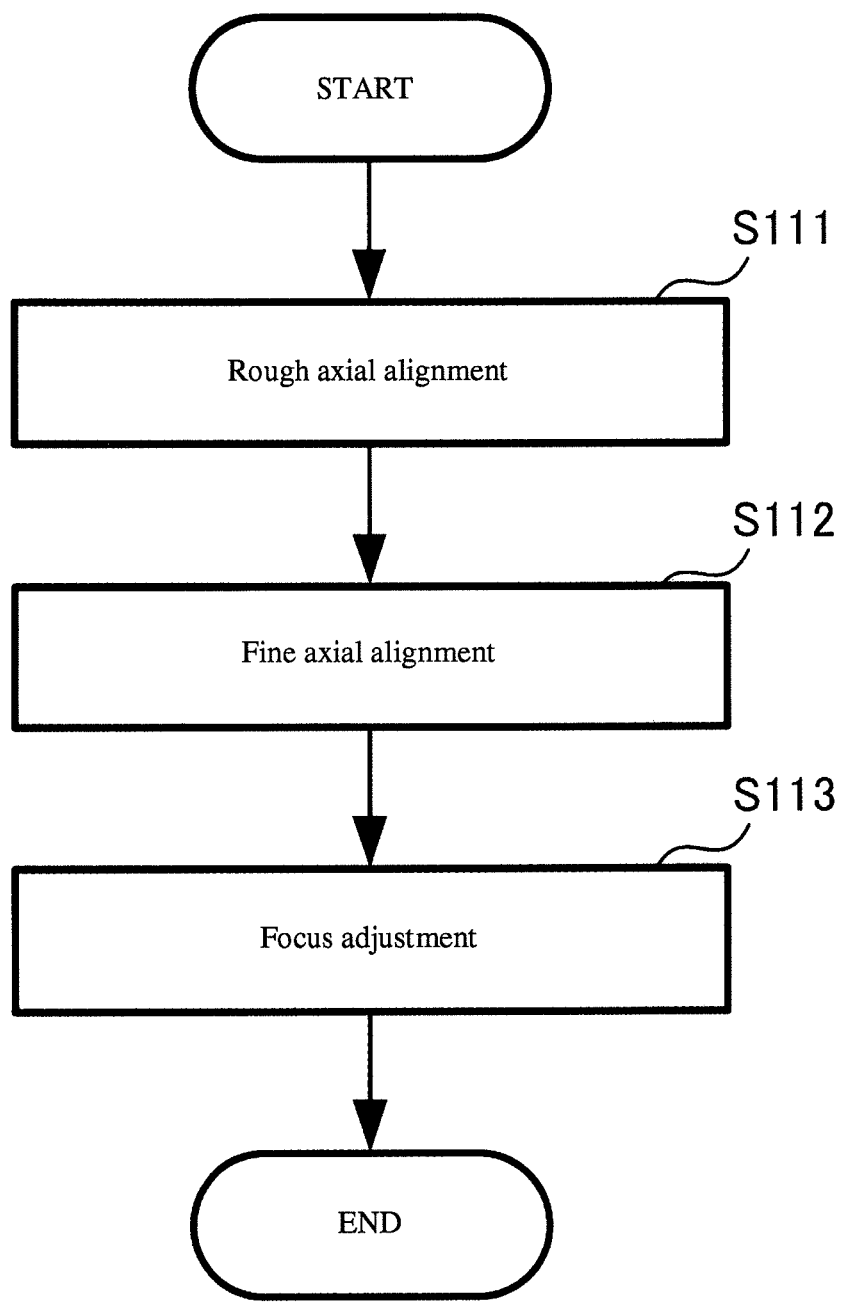
FIG. 7 is a flow chart illustrating an exemplary flow of the measurement program according to the embodiment.

FIGS. 6 and 7 are flow charts illustrating an exemplary flow of the measurement program according to the present embodiment. The measurement program according to the present embodiment causes the computer to serve as a mechanism that corresponds to steps (1) to (3) described above. The processes of steps S110 to S130 illustrated in FIG. 6 correspond to steps (1) to (3) described above.

First, an alignment step is conducted that determines the position of the interferometric optical system 152 relative to the object W (step S110). FIG. 7 illustrates a detailed protocol of the alignment step of step S110. In the alignment step, first, rough axial alignment is performed (step S111). In the rough axial alignment, for example, based on a two-dimensional image obtained by capturing an image of the object W with the image optical system 151, design data for the object W, or the like, the interferometric optical system 152 is displaced relative to the object W using the X, Y, and Z axis drive mechanisms of the device main body 10 and a center axis of the surface of cylindrical shape (of object W) is made to roughly coincide with the rotation axis A of the rotation drive mechanism 153a.

Next, fine axial alignment is performed (step S112). In the fine axial alignment, in a state where the rotation angle for the rotation drive mechanism 153a is fixed, a plurality of interference images is captured while the interferometric optical system 152 is displaced in the radial direction by the radial direction drive mechanism 153b (that is, while changing a distance between the cylindrical surface (of object W) and the interferometric optical system 152). Capturing images while displacing the interferometric optical system 152 in the radial direction in this way is referred to below as a radial direction scan. Also, by detecting a focus position where the intensity of the interference light reaches a peak at various measurement positions in the image capture field of view, the height of a measured surface at each measurement position is measured and the three-dimensional shape of the object W is measured. The three-dimensional shape obtained at this point is fitted to an ideal cylindrical shape, thereby finding an accurate center axis for the object W. Also, using the X, Y, and Z axis drive mechanisms of the device main body 10, the interferometric optical system 152 is displaced relative to the object W such that the rotation axis A of the rotation drive mechanism 153a coincides with the center axis of the object W.

Next, focus adjustment is performed in a state where the center axis of the object W and the rotation axis A of the rotation drive mechanism 153a coincide (step S113). In the focus adjustment, a radial direction scan is performed once again. Also, a radial direction focus position is detected where the intensity of the interference light at a predetermined position (for example, the center) in the image capture field of view reaches a peak, and the interferometric optical system 152 is displaced to the radial direction focus position by the radial direction drive mechanism 153b. The above completes the alignment step (S110).

Next after the alignment step, an image capture step is conducted in which interference images of the object W are captured on a running basis (step S120). In the image capture step, unlike the radial direction scan in the alignment step, the interferometric optical system 152 is not displaced in the radial direction. In other words, the interferometric optical system 152 is fixed at the radial direction focus position for the radial direction position, and in this state, interference images are captured on a running basis while rotationally displacing the interferometric optical system 152 by a predetermined angle each time, centered on the rotation axis A, using the rotation drive mechanism 153a. At this point, the rotation angle for one rotational displacement may be a rotation angle that shifts the image capture field of view of the interference image by one pixel. In the image capture step, while maintaining the state where the radial direction position is fixed in the radial direction focus position, image capture is repeatedly performed while displacing the image capture field of view using the rotation drive mechanism 153a and the axis direction drive mechanism so as to be able to cover a measurement range that was defined ahead of time. A procedure for displacing the image capture field of view repeatedly performs a protocol in which, while the rotation angle is changed and the image capture field of view is displaced in a lateral direction (circumference direction of the cylindrical surface) in a state where an axis direction position is fixed, image capture is performed at all required rotation angles for the axis direction position, after which the axis direction position is moved. Specifically, in the image capture step, while keeping the distance of the interferometric optical system 152 from the rotation axis A constant, the interferometric optical system 152 is rotationally displaced by a predetermined rotation angle unit each time by the rotation drive mechanism 153a, and the interference image for each rotation angle is acquired.

Figure 8A:
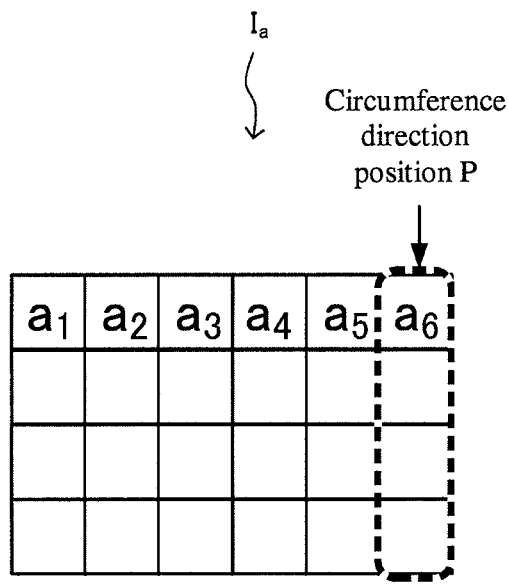
FIGS. 8A to 8D schematically illustrate interference images captured by changing a rotation angle for a rotation drive mechanism.
Figure 8B:
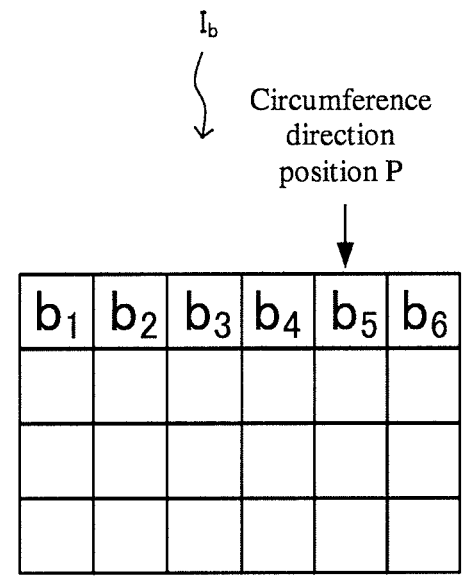
Figure 8C:
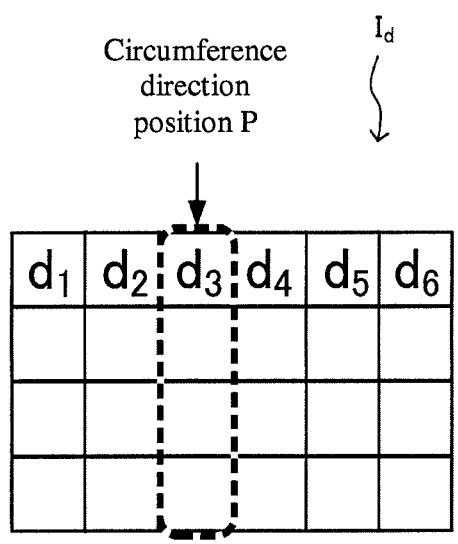
Figure 8D:
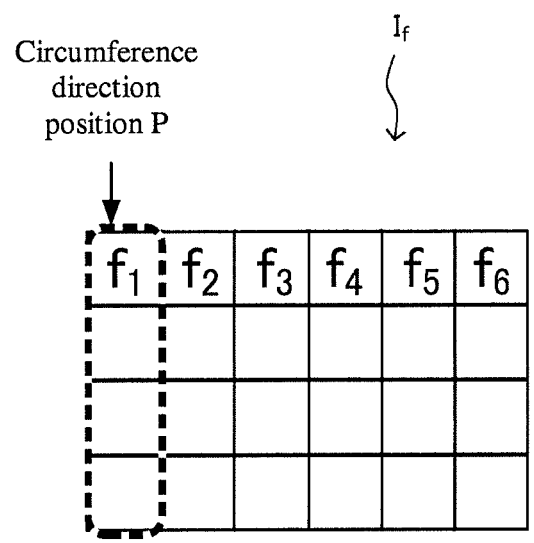

Next, an analysis step is conducted in which the three-dimensional shape of the object W is obtained based on the plurality of interference images obtained in the image capture step (step S130). FIGS. 8A to 8D schematically illustrate interference images captured by changing the rotation angle for the rotation drive mechanism 153a. In each of the figures, cells shown as squares each represent one pixel. In this example, in order to facilitate understanding of the idea of the present invention, the number of lateral pixels provided is six and the number of vertical pixels provided is four, but of course the number of pixels can be increased as desired. FIG. 8A schematically illustrates an interference image (image $I_a$) captured at an initial position. FIG. 8B schematically illustrates an interference image (image $I_b$) captured at a rotation angle reached by rotating from the initial position by an angle equivalent to one pixel. FIG. 8C schematically illustrates an interference image (image $I_d$) captured at a rotation angle reached by rotating from the initial position by an angle equivalent to three pixels. FIG. 8D illustrates an interference image (image $I_f$) captured at a rotation angle reached by rotating from the initial position by an angle equivalent to a number of pixels one pixel less than the number of lateral pixels in the interference image (in this example, five pixels).

This example focuses on a position (hereafter referred to as a circumference direction position) in the lateral direction of the object W (circumference direction of the cylindrical surface) in the images captured at the various rotation angles. In the image $I_a$, a circumference direction position P of the object shown on the right end ($a_6$) is shown in the second column from the right ($b_5$) in the image $I_b$ accompanying the relative movement of the image capture field of view by one pixel. Furthermore, the circumference direction position P is shown in the fourth column from the right ($d_3$) in the image $I_d$. Also, the circumference direction position P is shown on the left end ($f_1$) in the image $I_f$. In this way, one circumference direction position on the object W ends up being shown at different pixel positions in the image capture field of view in the plurality of interference images according to the rotation angle at the time each image is captured. However, based on the rotation angle at the time of image capture, the same circumference direction position (for example, the circumference direction position P) on the object W can be specified in the plurality of images captured at the different rotation angles. Hereafter, rotation equivalent to one pixel and image capture are repeated in a similar manner, and a plurality of interference images encompassing the measurement range are captured.

Meanwhile, as was already described, in the image measuring device 1 according to the present embodiment, the reference mirror 231 is arranged tilted, and therefore the optical path length of the reference light differs depending on the pixel position in the lateral direction in the image capture field of view. Accordingly, capturing a plurality of interference images by rotating the interferometric optical system 152 using the rotation drive mechanism 153a and capturing one circumference direction position (for example, the circumference direction position P) on the object W at different pixel positions, as illustrated in FIGS. 8A to 8D, is the same as capturing a plurality of interference images while changing the optical path length of the reference light path.

Figure 9A:
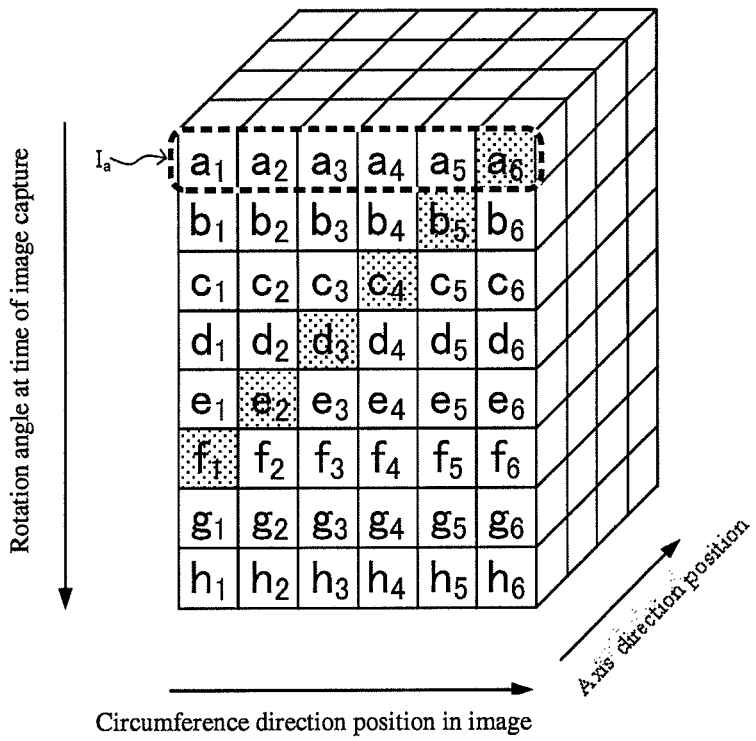
FIG. 9A schematically illustrates an image stack where data is stored in a 3D memory space.
Figure 9B:
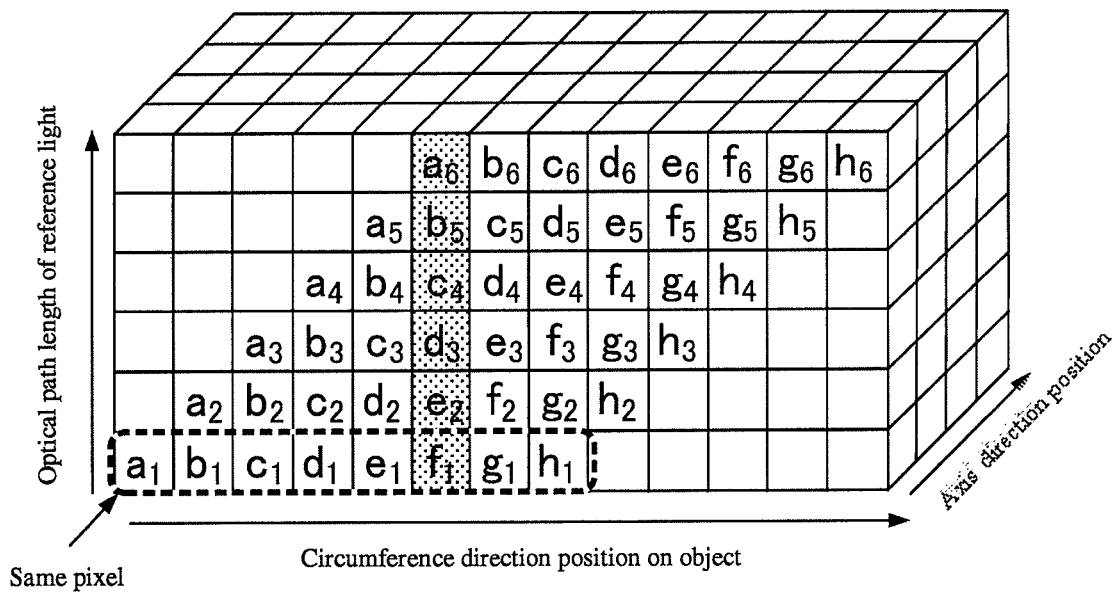
FIG. 9B schematically illustrates a shifted image stack in which the image stack of FIG. 9A is reconfigured.
Figure 10:
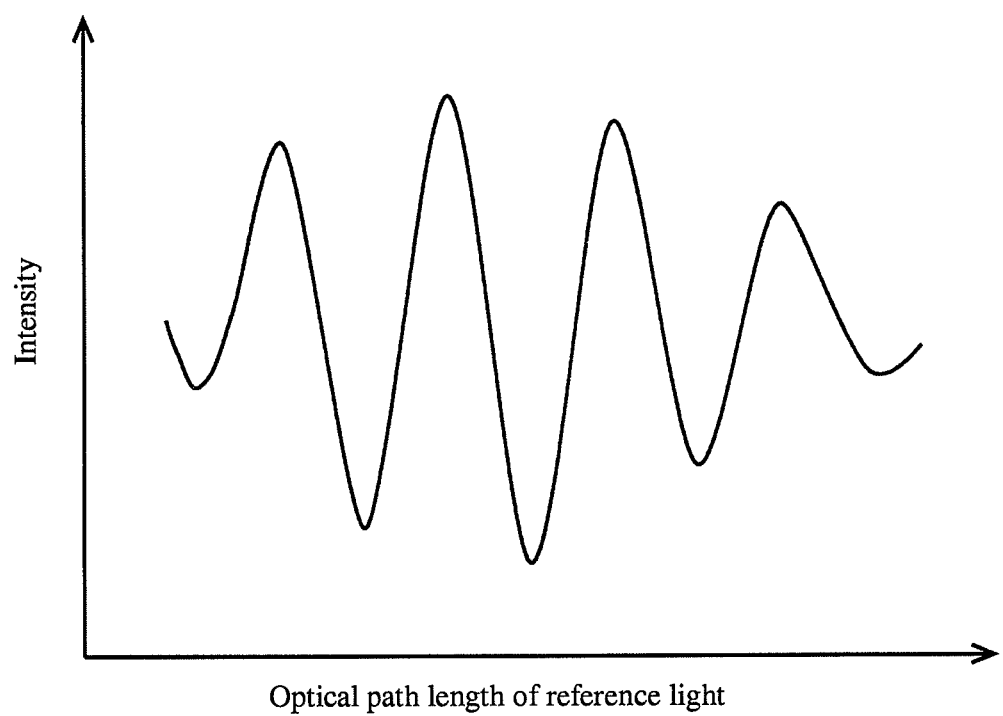
FIG. 10 is a graph illustrating an exemplary change in interference optical intensity relative to a change in rotation angle.

FIG. 9A schematically illustrates an image stack in which data for eight images $I_a$ to $I_h$ captured as described above is stored in a three-dimensional (corresponding to the three dimensions of height in the image (cylinder axis direction position), width in the image (cylinder circumference direction position), and rotation angle at the time of image capture) memory space. As illustrated in FIG. 9A, when data for light collected at the same pixel is aggregated in a time axis direction, a single position on the object W shifts one pixel to the left in each image, from the image $I_a$ to the image $I_h$, in association with the difference in rotation angle at the time of image capture. For example, the data corresponding to the position P may be stored in a region marked with the dashed box in FIG. 9A. As illustrated in FIG. 9B, a plurality of such image data is configured as a shifted image stack which is reconfigured by shifting a storage position by one for each unit of data belonging to the same pixel in each image (for example, $a_1$ to $h_1$ shown by the dashed line in FIG. 9B). As illustrated in FIG. 9B, in the shifted image stack, the data corresponding to one circumference direction position (for example, the position P; equivalent to the region marked with the dashed box) on the object W overlaps. Also, with respect to the same circumference direction position in the shifted image stack, the vertical direction (stacking direction) becomes an axis equivalent to the optical path length of the reference light path that changes in association with rotation by the rotation drive mechanism 153a. Accordingly, for each position in the shifted image stack, when the intensity of the interference light stacked in the vertical direction is plotted, as illustrated in FIG. 10, just as when the optical path length of the reference light path is changed, increases and decreases are observed in the intensity of the interference light associated with interference patterns.

Given this, using the optical path length of the reference light (the optical path length of the reference light can be calculated from the inclination angle of the reference mirror 231) where the amplitude of the interference optical intensity is greatest for each position in the shifted image stack, the height (that is, the distance from the interferometric optical system 152) of the position P on the object W may be found. In the analysis step, the height is similarly found for a position on the object W other than the position P, and the data for the heights of all measurement points is synthesized and output as a three-dimensional shape of the object W. In other words, the computer calculates the interior wall shape of the object W based on the plurality of interference images acquired in states where the rotation angle for the rotation drive mechanism 153a differs.

In the image measuring device 1 according to the present embodiment, the three-dimensional shape of the object W is measured as described above.

Modifications

An embodiment of the invention is described above. However, the present invention is not limited to this example. For example, when the reference mirror 231 is tilted as described above, the reflecting surface of the reference mirror 231 may also be a curved surface that matches a curvature of the object W. For example, the reflecting surface of the reference mirror 231 may be formed in the concave or convex shape of a partial cylinder corresponding to the shape of the surface to be measured. When the reflecting surface of the reference mirror 231 is config- ured as a curved surface, the curvature may also be variable. For example, both ends of a flat-spring-like reflecting plate may be supported by two supports having a changeable spacing, and the reflecting plate may be warped, and the curvature modified by changing the spacing between the two supports. By configuring the reflecting surface of the reference mirror 231 as a curved surface that matches the curvature of the object W in this way, a relationship between the height (unevenness using an ideal curved surface as a standard reference) and a change in the interference intensity can approach linearity, and a degree of measurement accuracy of the unevenness can be enhanced.

Figure 11:
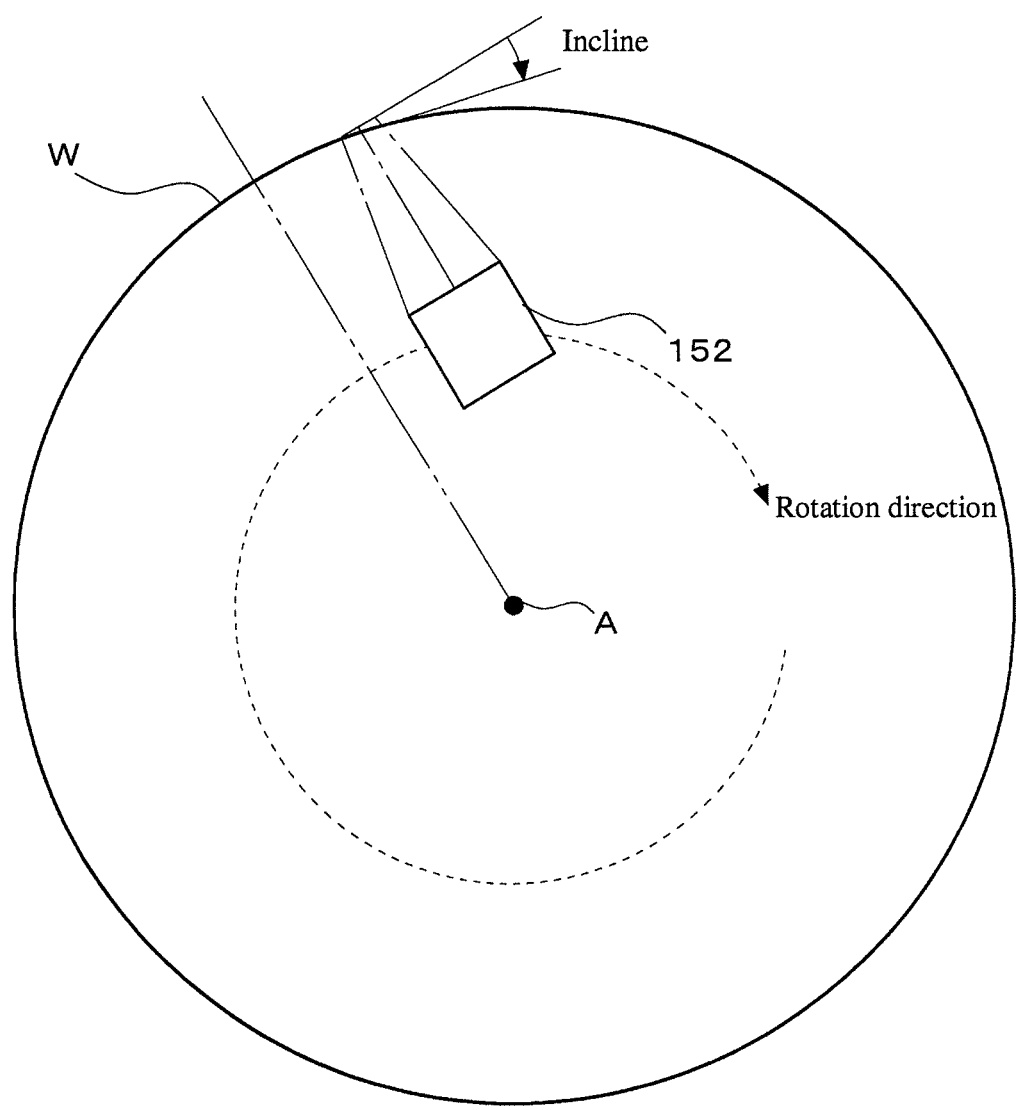
FIG. 11 is a schematic view (top view) illustrating an arrangement of the interferometric optical system in a modification of the embodiment.

In addition, as illustrated in FIG. 11, instead of the reference mirror 231 being tilted, a straight line extending the optical axis of the reflected light (measurement light) from the reflecting surface 222a of the beam splitter 222 may be arranged offset from a symmetrical position so as to not pass through the rotation axis A. With this configuration, in a case where the cylindrical interior wall is used as the object W, when focusing on one position on the object W, the optical path length of the measurement light changes spontaneously due to the curvature of the interior wall surface, accompanying rotation of the interferometric optical system 152. Therefore, the same benefits can be obtained as with tilting the reference mirror 231 in the embodiment described above.

In the image capture step in the embodiment above, the plurality of interference images is captured while the rotation angle is changed in a state where the axis direction position is fixed and the image capture field of view of the interference image changes in a lateral direction (circumference direction of the cylindrical surface). However, the present invention may also be configured to capture images while modifying the image capture field of view in a spiral shape, using the rotation drive mechanism 153a and the axis direction drive mechanism.

In the embodiment described above, a radial direction scan in the fine axial alignment of the alignment step and a radial direction scan in the focus adjustment are performed at one rotation angle. However, these radial direction scans may also be performed at a plurality of rotation angles, rather than just one. By using the results of radial direction scans performed at a plurality of rotation angles, errors can be inhibited.

Figure 12:
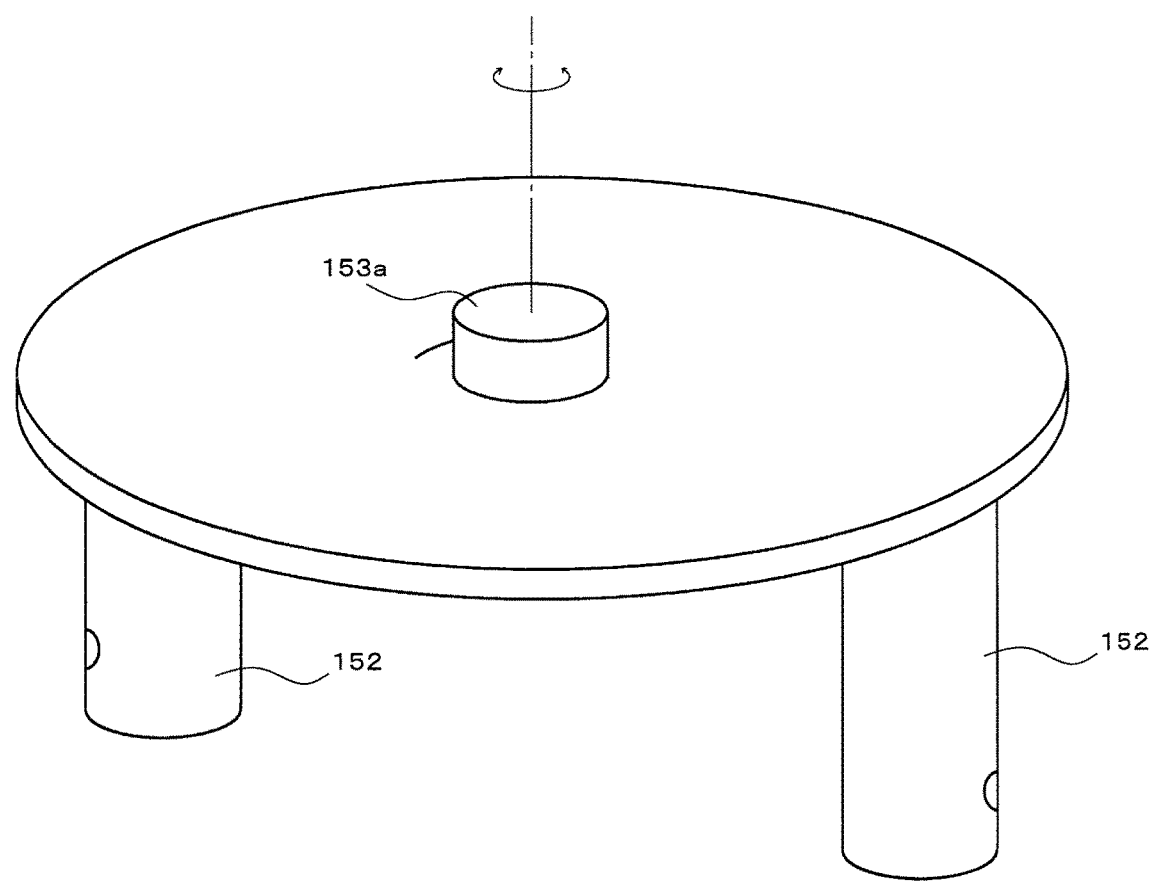
FIG. 12 is a schematic view (perspective view) illustrating an arrangement of the interferometric optical system in another modification of the embodiment.

In the embodiment above, the image measuring device 1 includes only one set of the objective lens portion 22 and the reference mirror portion 23. However, as illustrated in FIG. 12, the image measuring device 1 may also be configured to include a plurality of interferometric optical systems (that is, sets of the illumination optics portion 21, the objective lens portion 22, and the reference mirror portion 23) capturing interference images with positions offset in a direction along the rotation axis A. In a case employing such a configuration, the image capture range in the direction along the rotation axis A for a given interferometric optical system may be arranged so as to partially overlap with the image capture range in the direction along the rotation axis A for the other interferometric optical system. Also, each of the interferometric optical systems may be configured to be individually movable in the radial direction. In the alignment step, the radial direction scan may be performed using each of the interferometric optical systems, and alignment may be conducted using the plurality of measurement results obtained at this time. With an alignment procedure such as this, accuracy can be enhanced while constraining the alignment time.

Figure 13:
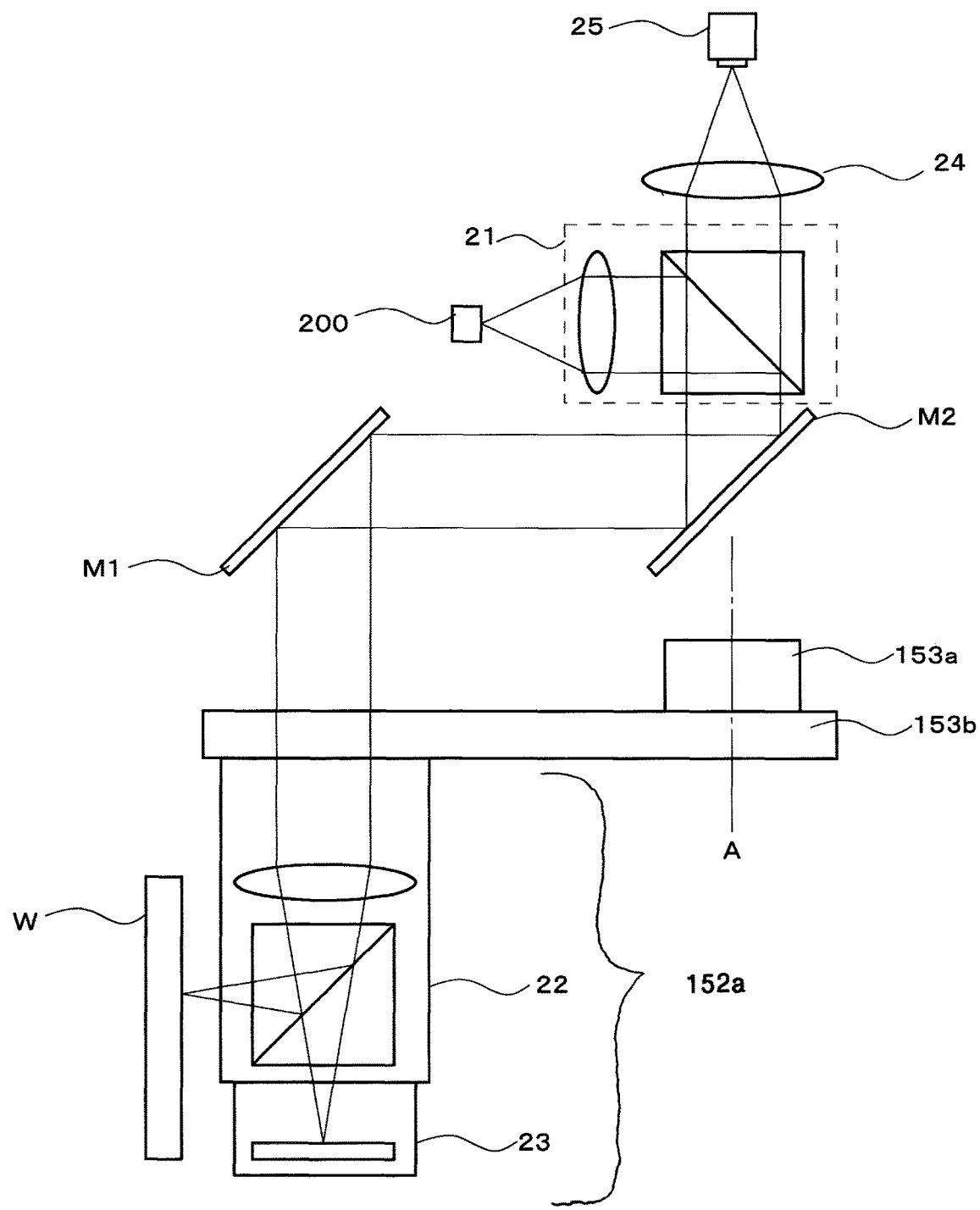
FIG. 13 is a schematic view (side view) illustrating an arrangement of an interferometric optical system in yet another modification of the embodiment.

In the embodiment described above, the entire interferometric optical system 152 (that is, the light emission portion 200; the illumination optics portion 21; the objective lens portion 22 and the reference mirror portion 23, collectively termed interferometric objective lens assembly 152a; the imaging lens 24; and the image capturer 25) are integrally displaced by the drive mechanism portion 153. However, as illustrated in FIG. 13, the present invention may be configured such that the light emission portion 200, the illumination optics portion 21, the imaging lens 24, and the image capturer 25 are arranged on the rotation axis A and are not included as targets for displacement in the radial direction by the radial direction drive mechanism 153b. Only the interferometric objective lens assembly 152a is then displaced in the radial direction. A reflecting mirror M2 positioned on the rotation axis and a reflecting mirror M1 aligned with the interferometric objective lens assembly 152a may be provided to complete the optical path. With such a configuration, the weight being displaced by the radial direction drive mechanism 153b is lightened and displacement in the radial direction can be facilitated.

A configuration where the light emission portion 200, the illumination optics portion 21, the imaging lens 24, and the image capturer 25 are arranged on the rotation axis A can also be applied to a case that employs a configuration that includes a plurality of interferometric objective lens assemblies. In such a case in particular, the image measuring device 1 should be configured to include only one set of the light emission portion 200, the illumination optics 21, the imaging lens 24, and the image capturer 25 within the device, and to have a plurality of interferometric objective lens assemblies 152a share these components. A reflecting mirror M2 positioned on the rotation axis may be rotated and a reflecting mirror M1 may be provided to each interferometric objective lens assembly, and switching between the plurality of interferometric objective lens assemblies may be carried out depending on which reflecting mirror M1 direction the reflecting mirror M2 is facing.

The measurement program according to the embodiment described above may also be stored on the computer-readable memory medium MM. In other words, a portion or all of the steps S110 to S130 illustrated in FIG. 6 may be stored on the memory medium MM in a computer-readable format. Further, the measurement program according to the embodiment may be delivered over a network.

In addition, in the embodiment described above, the interferometric optical system 152 utilizing a white light interferometry method is used as the measurement head. However, the present invention can also be applied to an image probe or laser probe.

With respect to the various above-described embodiments, a person skilled in the art can perform addition, deletion, and design modification of configuration elements as appropriate, and can combine features of the various embodiments as appropriate, and such modifications are also included in the scope of the present invention as long as they fall within the subject matter of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An interferometric optical device for measuring a curved wall shape of a cylindrical object and comprising:
   an interferometric optical system that emits measurement light at an interior wall of the object, collects the light reflected by the object, and creates a composite wave that combines the reflected light and a reference light beam from a reference mirror, wherein the interferometric optical system includes:
      a beam splitter that splits incident light into the reference light and the measurement light, and that outputs a composite wave that includes the recombined light beams that have separately traversed a reference light path or have been reflected from the object; and
      a reference mirror provided on the reference light path and that reflects the reference light beam, wherein the reference mirror is tilted with respect to an optical axis of the reference light, with a direction parallel to the optical axis of the measurement light as an axis of inclination;
   a rotation drive assembly that is connected to the interferometric optical system and that rotationally displaces the interferometric optical system centered about a rotation axis that coincides with a center axis of the cylindrical object;
   a sensor that acquires a two-dimensional distribution of the intensity of the composite wave using a plurality of photoreceptor elements arrayed two-dimensionally; and
   a computer comprising a processor and one or more memories that store a set of executable instructions such that the processor, when executing the set of executable instructions, causes the computer to compute the internal wall shape of the object based on the plurality of two-dimensional distributions acquired in a state where a rotation angle for the rotation drive assembly varies.

2. The interferometric optical device according to claim 1, wherein the interferometric optical device rotationally displaces the interferometric optical system by a predetermined rotation angle unit each time using the rotation drive assembly while keeping a distance of the interferometric optical system from the rotation axis constant, and acquires the two-dimensional distribution for each rotation angle using the sensor.

3. The interferometric optical device according to claim 1, wherein the reference mirror has a reflecting surface of either a concave or convex partial cylindrical shape.

4. The interferometric optical device according to claim 3, wherein the reflecting surface of the reference mirror has a variable curvature.

5. The interferometric optical device according to claim 1, wherein the interferometric optical system is arranged such that a straight line extending along the optical axis of the measurement light emitted at the interior wall of the object does not pass through the rotation axis.

6. The interferometric optical device according to claim 1, further comprising an axis direction drive assembly that displaces the interferometric optical system in a direction along the rotation axis, wherein:
the interferometric optical system is displaceable in a spiral shape, and
the two-dimensional distribution is acquired at each position along the spiral while using a position sensor.

7. The interferometric optical device according to claim 1, wherein the device is equipped with a plurality of the interferometric optical systems each having a mutually different position in a direction about the rotation axis.

8. The interferometric optical device according to claim 1, further comprising a radial direction drive assembly operably connected to the interferometric optical system and which displaces the interferometric optical system in a radial direction orthogonal to the rotation axis.

9. The interferometric optical device according to claim 1, further comprising a radial direction drive assembly operably connected to the interferometric optical system, wherein the radial direction drive assembly does not displace the interferometric optical system in a radial direction orthogonal to the rotation axis.

10. An interferometric optical device for measuring a curved wall shape of a cylindrical object and comprising:
an interferometric optical system that emits measurement light at an interior wall of the object, collects the light reflected by the object, and creates a composite wave that combines the reflected light and a reference light beam from a reference mirror;
a rotation drive assembly that is connected to the interferometric optical system and that rotationally displaces the interferometric optical system centered about a rotation axis that coincides with a center axis of the cylindrical object;
a sensor that acquires a two-dimensional distribution of the intensity of the composite wave using a plurality of photoreceptor elements arrayed two-dimensionally; and
a computer comprising a processor and one or more memories that store a set of executable instructions such that the processor, when executing the set of executable instructions, causes the computer to compute the internal wall shape of the object based on the plurality of two-dimensional distributions acquired in a state where a rotation angle for the rotation drive assembly varies,
wherein the interferometric optical system is arranged such that a straight line extending along the optical axis of the measurement light emitted at the interior wall of the object does not pass through the rotation axis.

11. An interferometric optical device for measuring a curved wall shape of a cylindrical object and comprising:
an interferometric optical system that emits measurement light at an interior wall of the object, collects the light reflected by the object, and creates a composite wave that combines the reflected light and a reference light beam from a reference mirror;
a rotation drive assembly that is connected to the interferometric optical system and that rotationally displaces the interferometric optical system centered about a rotation axis that coincides with a center axis of the cylindrical object;
an axis direction drive assembly that displaces the interferometric optical system in a direction along the rotation axis;
a sensor that acquires a two-dimensional distribution of the intensity of the composite wave using a plurality of photoreceptor elements arrayed two-dimensionally; and
a computer comprising a processor and one or more memories that store a set of executable instructions such that the processor, when executing the set of executable instructions, causes the computer to compute the internal wall shape of the object based on the plurality of two-dimensional distributions acquired in a state where a rotation angle for the rotation drive assembly varies, wherein:
the interferometric optical system is displaceable in a spiral shape, and
the two-dimensional distribution is acquired at each position along the spiral while using a position sensor.

* * * * *